(12) United States Patent  (10) Patent No.: US 8,157,371 B2
Suzuki  (45) Date of Patent: Apr. 17, 2012

(54) RECORDING APPARATUS AND RECORDING METHOD

(75) Inventor: Katsuhito Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 12/503,694

(22) Filed: Jul. 15, 2009

(65) Prior Publication Data

US 2010/0013903 A1    Jan. 21, 2010

(30) Foreign Application Priority Data

Jul. 15, 2008    (JP) .................................. 2008-183509

(51) Int. Cl.
*B41J 2/01* (2006.01)
*B41J 2/435* (2006.01)
(52) U.S. Cl. .................. 347/105; 347/262; 347/264
(58) Field of Classification Search .................. 347/4, 5, 347/16, 105, 229, 234, 248, 151, 264
See application file for complete search history.

(56) References Cited

U.S. PATENT DOCUMENTS 5,696,596 A * 12/1997 Taniguchi .................. 358/300
5,731,883 A * 3/1998 Morton et al. .............. 358/451

FOREIGN PATENT DOCUMENTS

JP    3471930 A    5/1996
JP    2007130769 A  *  5/2007

* cited by examiner

*Primary Examiner* — Hai C Pham
(74) *Attorney, Agent, or Firm* — Nutter McClennen & Fish LLP; John J. Penny, V.

(57) ABSTRACT

Provided is a recording apparatus capable of performing recording on a recording medium having a lenticular lens. The recording apparatus includes a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element; a distance information acquisition unit that acquires information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed; a correction unit that corrects the recording position on the target recording medium based on the distance information obtained by the distance information acquisition unit; and a recording unit that performs recording on the recording medium based on the recording position corrected by the correction unit.

7 Claims, 9 Drawing Sheets

TABLE 1

| MOUNTING POSITION | MEASURED DISTANCE OF EDGE Eb |
|---|---|
| Q0 | X1 |
| Q1 | X2 |
| Q2 | X3 |
| Q3 | X4 |

RECORDING APPARATUS AND RECORDING METHOD

Priority is claimed under 35 U.S.C §119 to Japanese Application No. 2008-183509 filed on Jul. 15, 2008, which is hereby incorporated by reference in its entirety.

BACKGROUND

1. Technical Field

The present invention relates to a recording apparatus and a recording method capable of performing recording on a recording medium having a lenticular lens.

2. Related Art

There is known a recording medium that includes a lenticular lens composed of a plurality of semi-cylindrical lens elements, which is arranged in parallel to be overlapped on a recording layer, so that the images recorded on the recording layer observed via the lenticular lens are perceived as stereoscopic images or variable picture images according to the viewing angle. For the images recorded on the recording medium to be perceived as predetermined stereoscopic images or variable picture images, it is necessary to align the recording position on the recording layer so as to comply with the arrangement of the lens elements of the lenticular lens.

The alignment of the image recording position with the arrangement of the lens elements of the lenticular lens is carried out as follows. The width and the arrangement pitch of the respective lens elements of the lenticular lens are identical to each other and they are known in advance. Therefore, the recording position is controlled based on the distance from the edge of the recording medium so that images are recorded at predetermined positions so as to comply with the known arrangement of the lens elements.

In some cases, the lenticular lens or the recording medium is produced in the desired size by cutting a large-format sheet. Therefore, the shape of the lens element disposed at the edge of the recording medium may differ from recording medium to recording medium or from production lot to production lot, depending on the cutting position.

For example, when the cutting position is positioned at the valley between neighboring lens elements, the lens element disposed at the edge assumes a semi-cylindrical shape. On the contrary, when the cutting is carried out at a position midway in the lens elements, the lens element disposed at the edge will not assume a semi-cylindrical shape. Therefore, when the recording position is controlled based on the distance from the edge of the recording medium, the positional relationship between the recorded images and the lens elements may change depending on the shape of the lens element disposed at the edge, namely the width of the lens element.

Therefore, when recording is performed on the recording medium, it is necessary to adjust the image recording position so as to correspond to the arrangement of the lens elements of the lenticular lens depending on the width of the lens element disposed at the edge of the recording medium. As a method for performing such an adjustment, a technique is disclosed in JP-B-3471930, for example. According to the technique, a plurality of patterns for detection of a positional deviation spaced at varying intervals in the arrangement direction of a lenticular lens are printed on a margin area of a lenticular printing medium. A user determines and selects the pattern printed at the optimum position from the printed plural patterns. Then, based on the optimum position, the recording position on the lenticular printing medium is corrected.

However, when using the technique disclosed in JP-B-3471930, the user needs to determine and select the pattern printed at the optimum position from the plural patterns, which may greatly increase the burden on the user.

SUMMARY

An advantage of some aspects of the invention is that it provides a recording apparatus and a recording method capable of correcting the recording position while reducing the burden on the user.

According to an aspect of the invention, there is provided a recording apparatus capable of performing recording on a recording medium having a lenticular lens, including: a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element; a distance information acquisition unit that acquires information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed; a correction unit that corrects the recording position on the target recording medium based on the distance information obtained by the distance information acquisition unit; and a recording unit that performs recording on the recording medium based on the recording position corrected by the correction unit.

By configuring the recording apparatus as described above, the recording position can be corrected without increasing the burden on the user.

In addition to the above-described invention, the recording apparatus further includes a storage unit, and the correction unit performs the correction based on information on the reference recording medium stored in the storage unit.

By configuring the recording apparatus as described above, the recording position can be corrected easily.

In addition to the above-described invention, the recording apparatus further includes a lens width difference calculation unit that calculates the difference between a lens width of the lens element at the edge of the reference recording medium and a lens width of the lens element at the edge of the target recording medium based on information on the distance between the reference edge and the predetermined reference position when the reference recording medium is mounted at a predetermined position on the mounting portion and the distance information on the target recording medium. The correction unit corrects the recording position on the recording medium based on the difference in the lens width and the correction amount.

By configuring the recording apparatus as described above, the recording position can be corrected easily.

According to an another aspect of the invention, there is provided a recording apparatus capable of performing recording on a recording medium having a lenticular lens, including: a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element; a distance information acquisition unit that acquires information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed; and a deficient width calculation unit that calculates a deficient width of the lens element at the edge of the target recording medium based on information on the distance between the reference edge and the predetermined reference position when a reference recording medium which is the recording medium, and of which the lens width of the lens element at the reference edge is known, is mounted at the predetermined position on the mounting portion, and the distance information on the target recording medium. The recording position on the target recording medium is corrected based on the deficient width calculated by the deficient width calculation unit.

By configuring the recording apparatus as described above, the recording position can be corrected without increasing the burden on the user.

In addition to the above-described invention, the mounting portion has a mark for mounting the target recording medium at the predetermined position.

By configuring the recording apparatus as described above, users can easily mount the target recording medium at the predetermined position.

In addition to the above-described invention, the positioning structure is formed of the same member as the lenticular lens of the recording medium.

By configuring the recording apparatus as described above, the positioning structure can be provided easily and high positioning accuracy can be provided.

According to a still another aspect of the invention, there is provided a recording method for performing recording on a recording medium having a lenticular lens, mounted on a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element, the method including: a distance information acquisition step for acquiring information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed; a correction step for correcting the recording position on the target recording medium based on the distance information obtained in the distance information acquisition step; and a recording unit that performs recording on the recording medium based on the recording position corrected in the correction step.

By configuring the recording apparatus as described above, the recording position can be corrected without increasing the burden on the user.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Hereinafter, an ink jet printer 1 (hereinafter, referred to simply as a printer), which is the recording apparatus according to an embodiment of the invention, will be described with reference to FIGS. 1 to 7. Moreover, the recording method according to the embodiment will be described in conjunction with the description of the operations of the printer 1.

General Configuration of Printer 1

Figure 1:
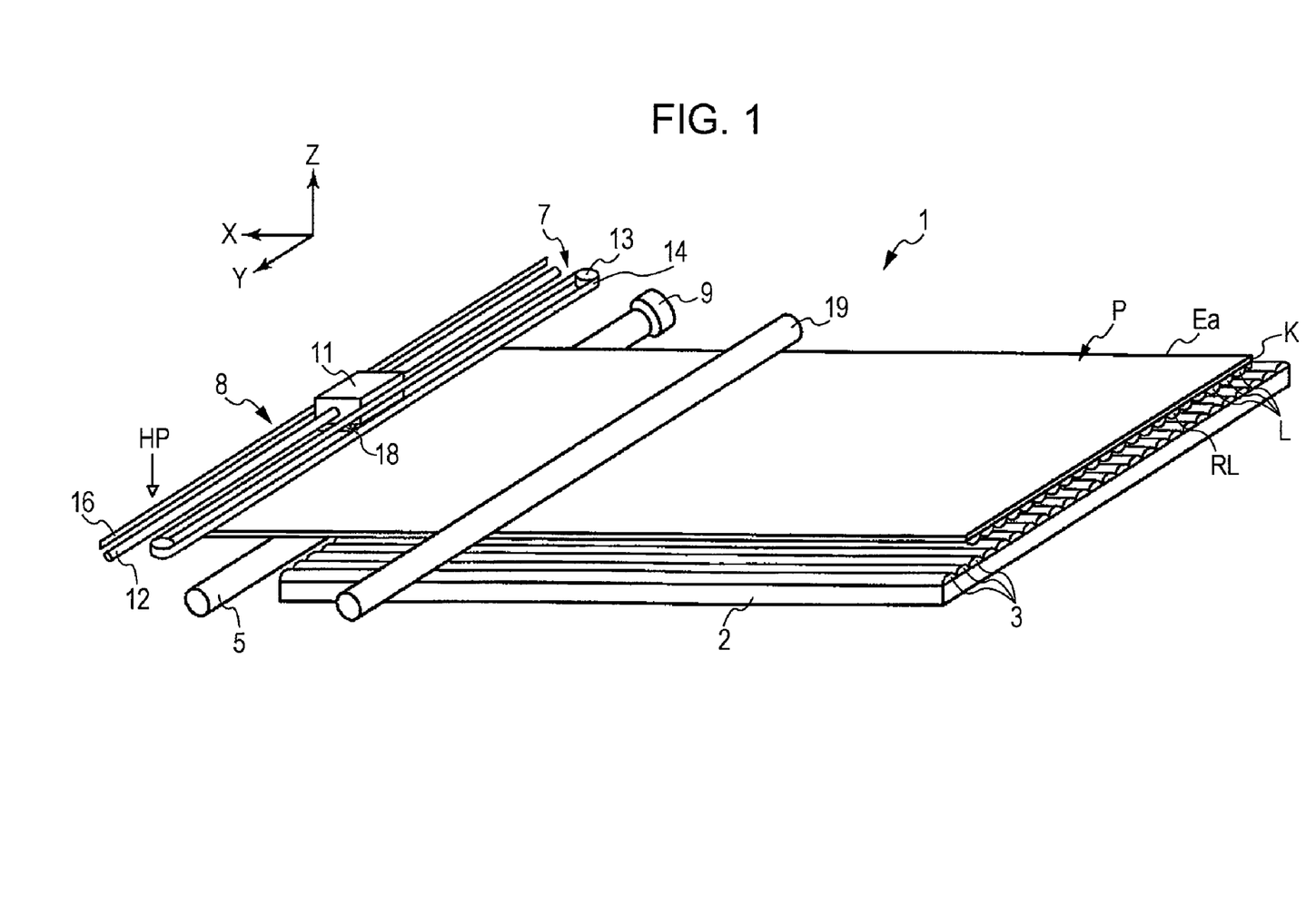
FIG. 1 is a schematic perspective view illustrating the configuration of a printer according to an embodiment of the invention.
Figure 2:
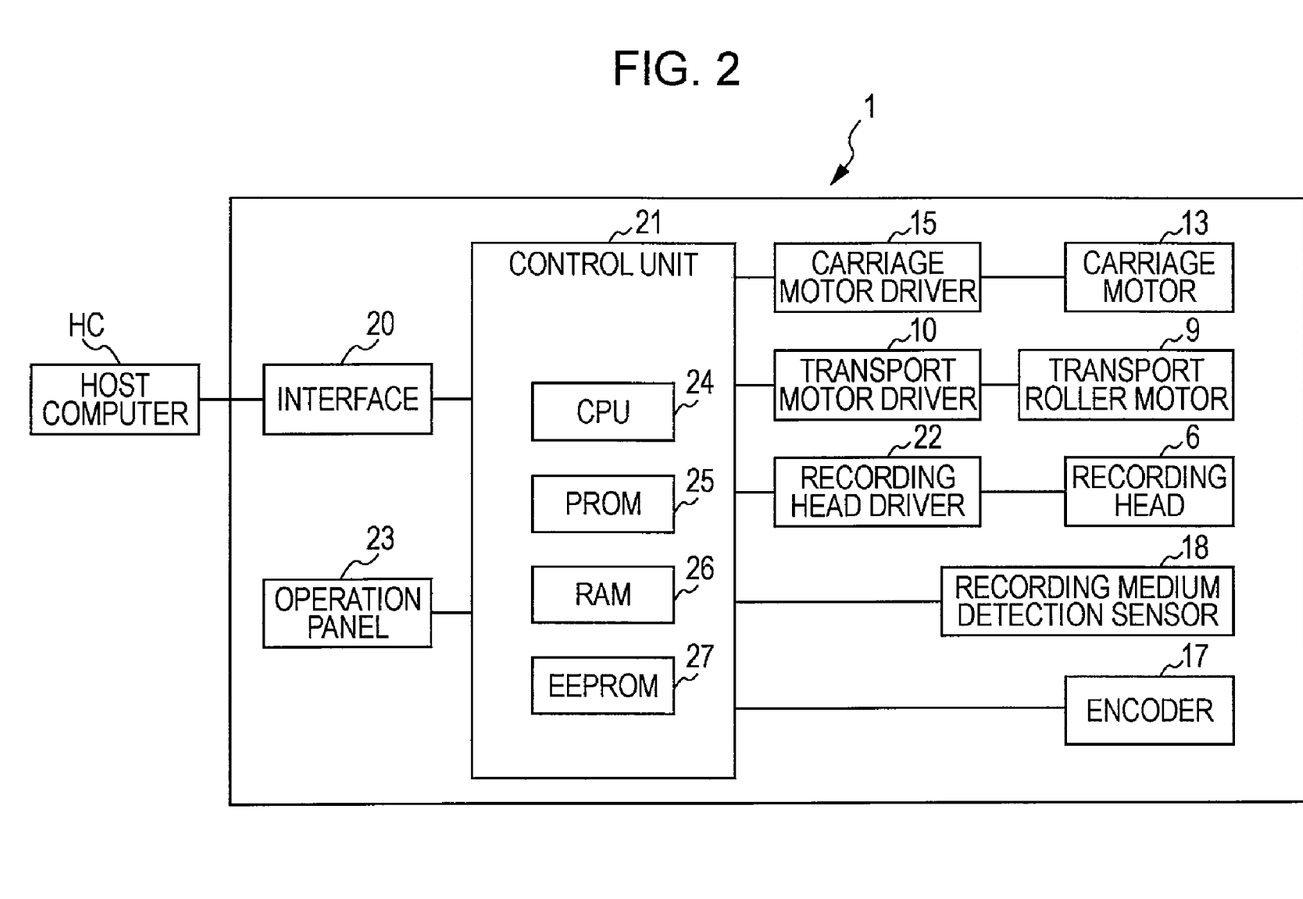
FIG. 2 is a schematic circuit diagram illustrating the electrical configuration of the printer illustrated in FIG. 1.
Figures 3A, 3B:
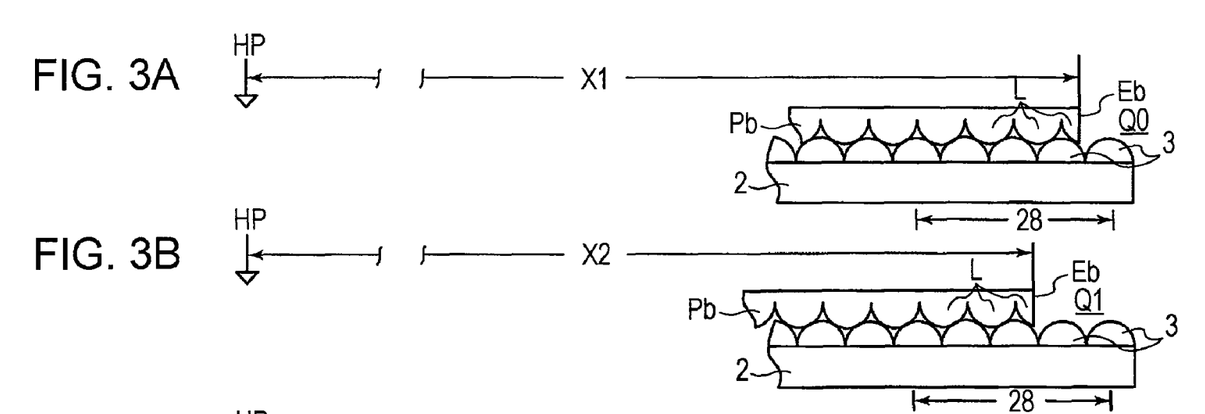
FIGS. 3A to 3D are schematic views illustrating the states where a reference recording medium is mounted on a guide tray.
Figure 3C:
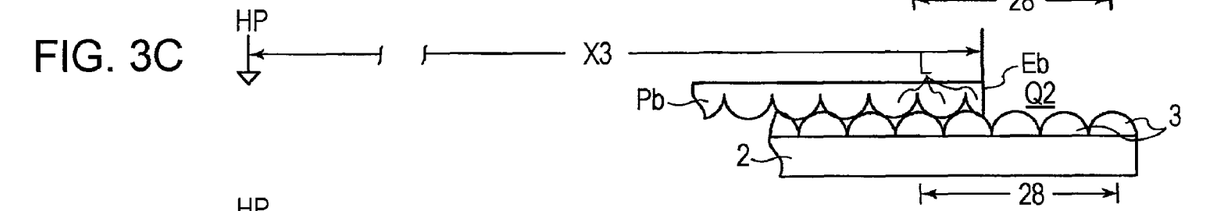
Figure 3D:
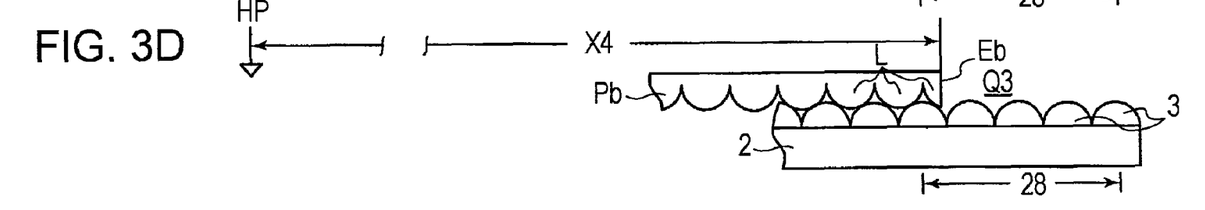

FIG. 1 is a schematic perspective view illustrating the general configuration of the printer 1. As will be described later, the printer 1 is configured to be capable of performing recording on a recording medium P having a lenticular lens RL. FIG. 2 is a schematic circuit diagram illustrating the electrical configuration of the printer 1 illustrated in FIG. 1. In FIG. 1, the direction indicated by the arrow X will be referred to as the forward direction (front side), and the opposite direction will be referred to as the backward direction (rear side). Moreover, the direction indicated by the arrow Y will be referred to as the leftward direction (left side), and the direction indicated by the arrow Z will be referred to as the upward direction (upper side).

The recording medium P on which images are recorded by the printer 1 is configured to include a lenticular lens RL composed of a plurality of semi-cylindrical lens elements L, which is arranged in parallel to be overlapped on a recording layer K, so that the images formed on the recording layer K can be visually observed via the lenticular lens RL. The respective lens elements L have identical horizontal widths (lens widths) and are arranged at equal pitches. Therefore, when a parallax image is recorded on the recording layer K so as to correspond to the lens width and the arrangement pitch of the lens elements L of the lenticular lens RL (hereinafter, the lens width and the arrangement pitch of the lens elements L of the lenticular lens RL will be collectively referred to as the arrangement pitch, etc. of the lenticular lens RL) and the image is observed from the side of the lenticular lens RL, the image can be observed as a stereoscopic image or as different images according to the viewing angle. The recording medium P may be configured without having the recording layer K formed thereon so that recording is performed directly on a surface opposite to the convex surface of the lens elements L of the lenticular lens RL.

In FIG. 1, the printer 1 includes a guide tray 2 as the mounting unit on which the recording medium P is mounted, protruding portions 3 as the positioning structures which are formed on the upper surface of the guide tray 2, a transport roller 5 that transports the recording medium P mounted on the guide tray 2 in the forward direction, a non-illustrated recording head 6 (see FIG. 2) that performs recording on the recording medium P being transported by the transport roller 5, a moving mechanism 7 that moves the recording head 6 in the horizontal direction, and an encoder 8 for detecting the horizontal position of the recording head 6.

The transport roller 5 is rotated by a transport roller motor 9, and the transport roller motor 9 is driven by a transport roller motor driver 10 (see FIG. 2). The recording head 6 is configured, for example, as an ink jet recording head that ejects ink, and is driven by a recording head driver 22 (see FIG. 2). The moving mechanism 7 includes a carriage 11 that supports the recording head 6, a guide shaft 12 that guides the carriage 11 in the horizontal direction, and a timing belt 14 that is driven by the carriage motor 13. The recording head 6 is mounted on the lower surface of the carriage 11.

The carriage 11 is mounted on the timing belt 14. When the timing belt 14 is rotated in the horizontal direction by the carriage motor 13, the recording head 6 is also moved in the horizontal direction along the guide shaft 12 simultaneously with the horizontal movement of the carriage 11. The carriage motor 13 is driven by a carriage motor driver 15 (see FIG. 2).

The encoder 8 is an optical encoder and includes a linear scaler 16 that is arranged in parallel with the guide shaft 12 and an encoder 17 (see FIG. 2) that is mounted on the carriage 11 so as to read information from the linear scaler 16. The encoder 17 includes a light emitting portion (not illustrated) and an optical sensor (not illustrated) which are disposed to have the linear scaler 16 therebetween. When the carriage 11 is moved, blocking or passing of the light emitted from the light emitting portion is determined by the linear scaler 16. Specifically, from the optical sensor of the encoder 17, an encoder signal is output, which is a pulse signal having High and Low levels corresponding to the blocking and passing of the emitted light. The encoder 8 is configured to be capable of measuring the moving distance of the carriage 11 by counting the number of pulses of the encoder signal. In the printer 1, a home position HP as a predetermined reference position is set at the left end of the linear scaler 16. Therefore, the position of the carriage 11 can be detected as its distance from the home position HP, namely the pulse count.

On the lower surface of the carriage 11, a recording medium detection sensor 18 is mounted in parallel with the recording head 6. The recording medium detection sensor 18 is configured to include a light emitting portion (not illustrated) and an optical sensor (not illustrated) and to be capable of detecting whether the recording medium P is present on a light emitting zone of the light emitting portion by detecting with the optical sensor whether or not light emitted from the light emitting portion is reflected from the recording medium P.

When recording is performed on the recording medium P, the recording medium P is mounted on the guide tray 2 with the side of the lenticular lens RL facing downward. The protruding portions 3 formed on the guide tray 2 are configured to have the same shape and the same pitch as the lens elements L of the lenticular lens RL formed on the recording medium P. The convex surface side faces upward. Therefore, when the recording medium P is mounted on the guide tray 2, portions of the convex portions of the protruding portions 3 come to be positioned between the neighboring lens elements L of the lenticular lens RL on the recording medium P, whereby the protruding portions 3 are engaged with the lens elements L with respect to the horizontal direction, namely the arrangement direction of the lens elements L. In this way, the recording medium P is mounted on the guide tray 2 in a state of being positioned with respect to the arrangement direction of the lens elements L.

The printer 1 is provided with a pressing roller 19 that applies a downward pressing force to the recording medium P being transported. By having the recording medium P pressed against the guide tray 2 by the pressing roller 19, the engagement between the lens elements L and the protruding portions 3 becomes hard to loosen, whereby the positioning of the recording medium P by the protruding portion 3 becomes secure. The protruding portions 3 are formed over a wider range of areas than the region on which the recording medium P is mounted. Therefore, when the recording medium P is mounted on the guide tray 2, the entire lens elements L of the recording medium P are engaged with the protruding portions 3, and the positioning of the recording medium P becomes more secure.

In the present embodiment, the protruding portions 3 are configured by bonding the recording medium P to the upper surface of the guide tray 2 in a state where the convex surface side of the lenticular lens RL faces upward. By providing the protruding portions 3 in the described manner, the positioning structures of the recording medium P can be easily provided. Moreover, by having the protruding portion 3 integrated into the recording medium P, it is possible to make the shape of the protruding portions 3 virtually identical to the shape of the lenticular lens RL of the recording medium P, thereby achieving an improvement in the positioning accuracy of the recording medium P.

Next, the schematic electrical configuration of the printer 1 illustrated in FIG. 1 will be described with reference to FIG. 2.

In FIG. 2, the printer 1 includes an interface 20 and a control unit 21 that receive image forming data or the like input from a host computer HC, the carriage motor 13 of the moving mechanism 7, the carriage motor driver 15 that drives the carriage motor 13, the transport roller motor 9, the transport roller motor driver 10 that drives the transport roller motor 9, the recording head 6, the recording head driver 22 that drives the recording head 6, the encoder 17 of the encoder 8, the recording medium detection sensor 18, and an operation panel 23.

The control unit 21 includes a CPU (central processing unit) 24 for performing various control operations described later based on the image forming data and the like delivered from the host computer HC, a PROM (programmable read-only memory) 25 for storing therein various types of programs or control data for controlling the printer 1, a RAM (random access memory) 26 used as a work memory, and an EEPROM (electrically erasable programmable read only memory) 27 for storing therein the image forming data input via the interface 20 from the host computer HC. The control operations of the CPU 24 include the ink ejection of the recording head 6, the driving of the carriage motor 13 and the transport roller motor 9, the later-described deficient width calculation of the lens elements L at a reference edge of the recording medium P, and the correction of a recording position based on the deficient width.

Recording Operation of Printer 1

Next, the recording operation of the printer 1 on the recording medium P will be described in brief.

The printer 1 starts the recording operation when a non-illustrated record start button provided on the operation panel 23 is pressed in a state where the recording medium P is mounted on the guide tray 2. Specifically, when the record start button is pressed, the recording medium P is transported on the guide tray 2 by the transport roller 5 in a direction from the rear side to the front side. Following transportation, the carriage 11 is moved back and forth in the horizontal direction and ink is ejected to a predetermined position from the recording head 6, whereby images are recorded on the recording layer K.

Transportation of the recording medium P is carried out by the transport roller motor 9 by the driving control of the CPU 24. The transport roller motor 9 transports the recording medium P in the forward direction while repeating a predetermined amount of transportation at a predetermined time interval. The recording medium P is mounted on the guide tray 2 with the side of the lenticular lens RL facing downward. Therefore, the lens elements L of the recording medium P and the protruding portions 3 are engaged with each other with respect to the horizontal direction, so that the recording medium P is transported in the state of being positioned relative to the guide tray 2 in the horizontal direction.

The CPU 24 controls the driving of the carriage motor 13 so that the carriage 11 is moved back and forth in the horizontal direction. Since the recording head 6 is mounted on the carriage 11, the recording head 6 is also moved back and forth together with the carriage 11. During a period when the transport of the recording medium P is stopped, the carriage 11 is moved from the right to the left of the recording medium P and ink is ejected from the recording head 6 during the right-to-left movement of the carriage 11, whereby images are recorded on the recording medium P.

As described above, when recording is performed on the recording medium P having the lenticular lens RL, it is necessary to align the recording position to comply with the arrangement pitch, etc. of the lenticular lens RL. For this alignment, the recording medium detection sensor 18 detects a reference edge which serves as a reference for the measurement of the moving distance of the carriage 11 and is defined at the edge in the arrangement direction of the lens elements L of the recording medium P, and then, based on the reference edge, the encoder 8 detects the position of the carriage 11 relative to the recording medium P. In the printer 1 according to the present embodiment, the right edge Ea of the recording medium P is defined as the reference edge. The CPU 24 measures the distance of the carriage 11 from the edge Ea using the encoder 8 so as to control the ink ejection position of the recording head 6 so that ink is ejected at the recording position corresponding to the arrangement pitch, etc. of the lenticular lens RL.

The lens width and the arrangement pitch of the lens elements L of the lenticular lens RL are stored in advance in the PROM 25. Therefore, the CPU 24 controls the driving of the recording head 6 based on the distance from the edge Ea obtained from the encoder 8 and the arrangement pitch, etc. of the lenticular lens RL stored in the PROM 25 so that the ink ejection position is positioned at a predetermined position with respect to the arrangement pitch, etc. of the lenticular lens RL.

In some cases, the recording medium P is produced in a desired size such as A4 or B5, for example, by cutting a large-format recording medium. When a large-format recording medium is cut into recording media P of a desired size, the cutting positions of the lens elements L may differ from cutting to cutting. For instance, in a certain cutting operation, cutting is carried out just on the valley between neighboring lens elements, and thus, the lens element L positioned at the edge Ea of the recording medium P assumes a semi-cylindrical shape. On the contrary, in another cutting operation, cutting is carried out at a position midway in the arc-shaped surface of the lens element L, and thus, the lens element L disposed at the edge Ea of the recording medium P assumes a shape that is deficient from a semi-circular shape.

Therefore, when recording is performed based on the distance from the edge Ea of the recording medium P, it may be difficult to align the recording position of the recording image to comply with the arrangement pitch, etc. of the lenticular lens RL without knowing the deficient width of the lens element L positioned at the edge Ea. For example, when recording is performed with the assumption that the lens element L at the edge Ea of the recording medium P is semi-cylindrical, regardless of the fact that the lens element L at the edge Ea of the recording medium P is deficient, the recording position relative to the lens elements L may be deviated by an amount corresponding to the width (deficient width) that the lens element L is deficient by. Hence, it may be difficult to align the recording position to comply with the arrangement pitch, etc. of the lenticular lens RL.

In order to obviate such a problem, in the present embodiment, before the recording operation is performed, as will be described later, the deficient width of the lens element L at the edge Ea of the recording medium P to which recording is to be performed is measured, and based on the measured deficient width, the recording position is controlled.

Setting of Reference Position

First, the setting of a reference position for the measurement of the deficient width will be described.

In order to measure the deficient width of the lens element L at the edge Ea of the recording medium P to which recording is to be performed, a reference recording medium Pb which is the recording medium P and of which the deficient width of the lens element L at the edge is known is prepared. As illustrated in FIGS. 3A to 3D, the reference recording medium P is mounted at positions by sequentially moving the position of the edge Eb, at which the lens element L of the reference recording medium Pb, of which the deficient width is known, is positioned, by one protrusion with respect to the protrusions of the protruding portions 3 in a direction from one side within a predetermined range 28 of the guide tray 2 to the other side. The mounting positions of the reference recording medium Pb illustrated in FIGS. 3A to 3D are denoted by Q0, Q1, Q2, and Q3, respectively. Moreover, the distance of the edge Eb from the home position HP for the respective mounting positions is measured. FIGS. 3A to 3D are enlarged rear views of the portion of the predetermined range 28 when the reference recording medium P is mounted on the guide tray 2 so that the edge Eb is positioned within the predetermined range 28. Here, Q0 to Q3 are the ranges where the recording medium P can be mounted without being brought into contact with other components of the printer 1 during the transportation of the recording medium P under the structure of the printer 1.

The measurement of the distance of the edge Eb from the home position HP is carried out by the recording medium detection sensor 18 and the encoder 8 which constitute the distance information acquisition unit. Specifically, the edge Eb is detected by the recording medium detection sensor 18, and the distance of the edge Eb from the home position HP is measured as the counted value of the encoder 8. For instance, by using the recording medium P, of which the width of the lens element L positioned at the edge Eb is known to be M, as the reference recording medium Pb, the distance from the home position HP to the edge Eb is measured as the counted value of the encoder 8 at the respective mounting positions (Q0, Q1, Q2, and Q3) while moving the edge Eb in a direction from one side to the other side within the predetermined range 28 so that its engagement with the protruding portions 3 is shifted by an amount of one protrusion.

The encoder 8 is configured so that the counted value of the encoder 8 increases as the carriage 11 becomes distant from the home position HP, that is, as it moves rightward from the home position HP.

Figure 4:
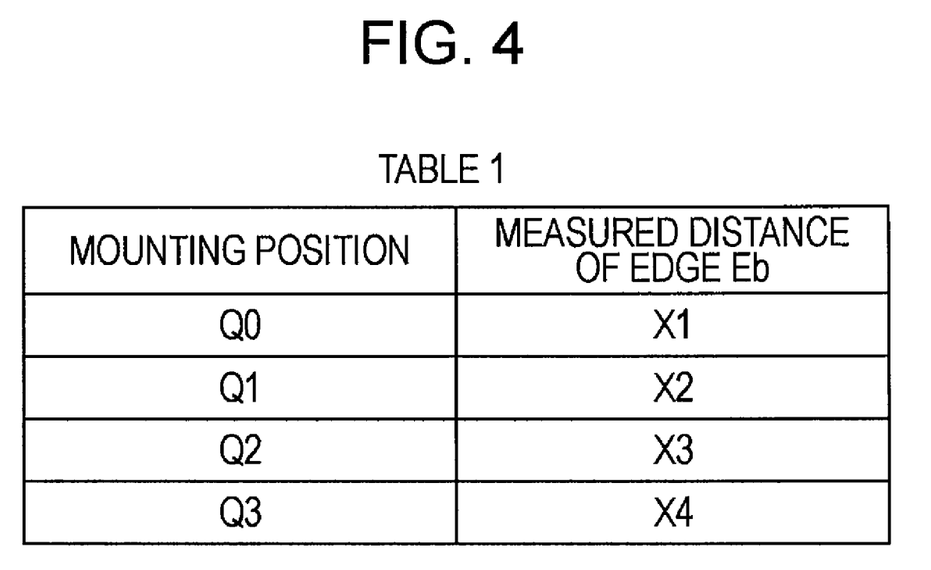
FIG. 4 illustrates Table 1 showing the distance of the edge of the reference recording medium from a home position.
Figure 5A:
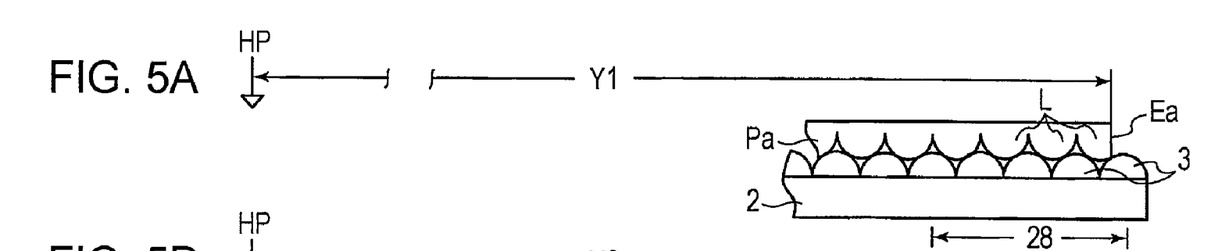
FIGS. 5A to 5D are schematic views illustrating the states where a target recording medium is mounted on the guide tray.
Figure 5B:
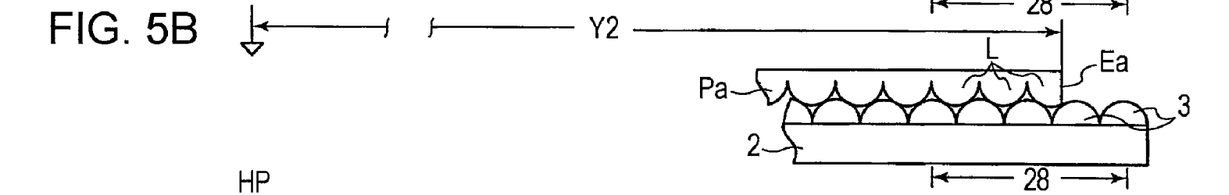
Figures 5C, 5D:
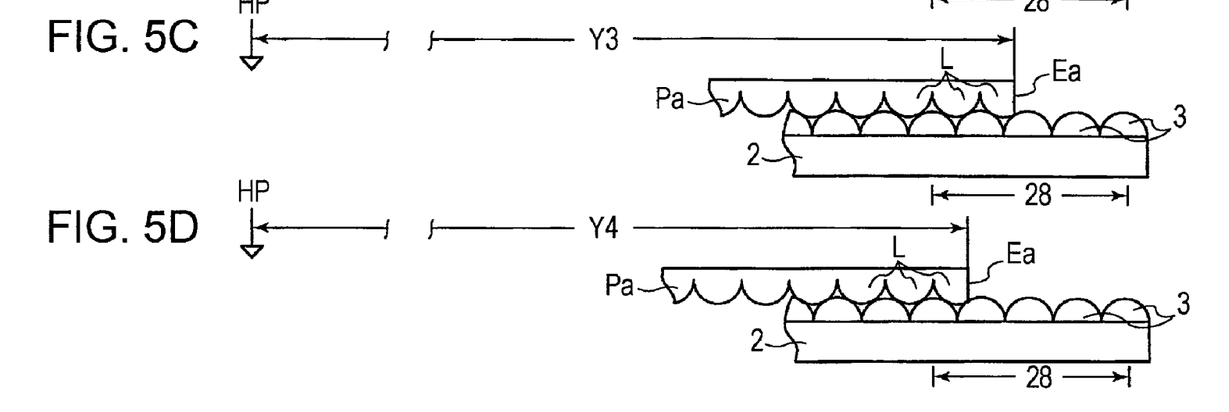

The measured distance from the home position HP, of the edge Eb at the respective mounting positions Q0, Q1, Q2, and Q3 of the reference recording medium Pb illustrated in FIGS. 3A to 3D is described in Table 1 illustrated in FIG. 4. The data of Table 1, namely, the mounting positions of the reference recording medium Pb and the measured distance from the home position HP, of the edge Eb at each mounting position are stored as the reference distance information in the EEPROM 25 as the recording unit.

The protruding portions 3 include protrusions at equal pitches and the mounting positions Q0, Q1, Q2, and Q3 are the values of the mounting position of the reference recording medium P obtained when the protrusions are moved from the right to the left by an amount of one protrusion. Therefore, the difference between the counted values of the encoder 8, of the neighboring mounting positions, namely X1-X2, X2-X3, and X3-X4, is constant. This difference is identical to the arrangement pitch of the protrusions of the protruding portions 3 and the width of each protrusion. Moreover, since the protruding portions 3 and the lenticular lens RL of the reference recording medium Pb have identical pitches, the above-mentioned difference is identical to the arrangement pitch, etc. of the lenticular lens RL. The values X1-X2, X2-X3, and X3-X4 may have different values depending on the relationship between the arrangement pitch, etc. of the lenticular lens RL and the pulse width of the encoder 8.

Although the data of Table 1 may be measured by an end user by using the printer 1 as described above, it is preferable that the supplier of the printer 1 measures the data during the manufacturing step of the printer 1 and has the measurement results, namely the data of Table 1, stored in the PROM 25 of the printer 1, thereby reducing the burden on the user.

Measurement of Deficient Width

Next, the measurement of the deficient width of a target recording medium will be described.

Subsequently, as illustrated in FIGS. 5A to 5D, before the recording operation is performed, the recording medium P (hereinafter, referred to as a target recording medium Pa) on which recording is to be performed is mounted on the guide tray 2 so that the edge Ea located on the side serving as the reference of the recording position is positioned within the predetermined range 28 of the guide tray 2. Then, the distance from the home position HP, of the edge Ea of the target recording medium Pa mounted on the guide tray 2 is measured. Since the target recording medium Pa is mounted on the guide tray 2 so that the edge Ea is positioned within the predetermined range 28, the target recording medium Pa is mounted at either of the positions illustrated in FIGS. 5A to 5D. FIGS. 5A to 5D are enlarged rear views of the portion of the predetermined range 28 when the target recording medium Pa is mounted on the guide tray 2 so that the edge Ea is positioned within the predetermined range 28.

When the distance from the home position HP of the edge Ea of the target recording medium Pa mounted on the guide tray 2 so that the edge Ea is positioned within the predetermined range 28, as illustrated in FIGS. 5A to 5D, is compared with the distance from the home position HP of the edge Eb of the reference recording medium Pb mounted on the guide tray 2 so that the edge Eb is positioned within the predetermined range 28, the following results can be obtained. That is to say, when the width of the lens element L at the edge Ea of the target recording medium Pa is larger than the width of the lens element L at the edge Eb of the reference recording medium Pb, the distance from the home position HP, of the edge Ea of the target recording medium Pa falls into one of the ranges: X1 or larger, between X1 and X2, between X2 and X3, and between X3 and X4. On the other hand, when the width of the lens element L at the edge Ea of the target recording medium Pa is smaller than the width of the lens element L at the edge Eb of the reference recording medium Pb, the distance from the home position HP, of the edge Ea of the target recording medium Pa falls into one of the ranges: between X1 and X2, between X2 and X3, between X3 and X4, and X4 or smaller. Since the target recording medium Pa is mounted on the guide tray 2 so that the edge Ea is positioned within the predetermined range 28, the distance of the edge Ea will not be located outside the predetermined range 28 even when the distance from the home position HP, of the edge Ea becomes X1 or larger or X4 or smaller. Here, the width of the lens element L of the reference recording medium Pb is known and is stored in advance in the PROM 25 of the printer 1, for example. Therefore, the deficient width of the lens element L of the target recording medium Pa can be calculated based on the difference between the measured distance (any one of Y1, Y2, Y3, and Y4) for the target recording medium Pa and the measured distance (X1, X2, X3, and X4) of the edge Eb of the reference recording medium Pb when the target recording medium Pa and the reference recording medium Pb are mounted at the predetermined position at which the lens elements L, which do not have any deficiency and are disposed inside the edges Ea and Eb, are positioned at identical positions on the guide tray 2.

Figure 6A:
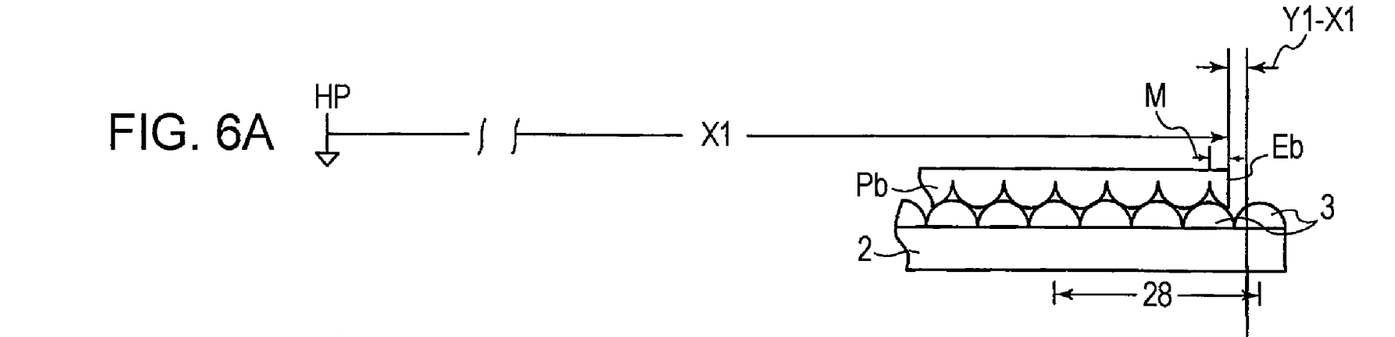
FIGS. 6A and 6B are schematic views for explaining the method of calculating a deficient width of a lens element L of the target recording medium.
Figure 6B:
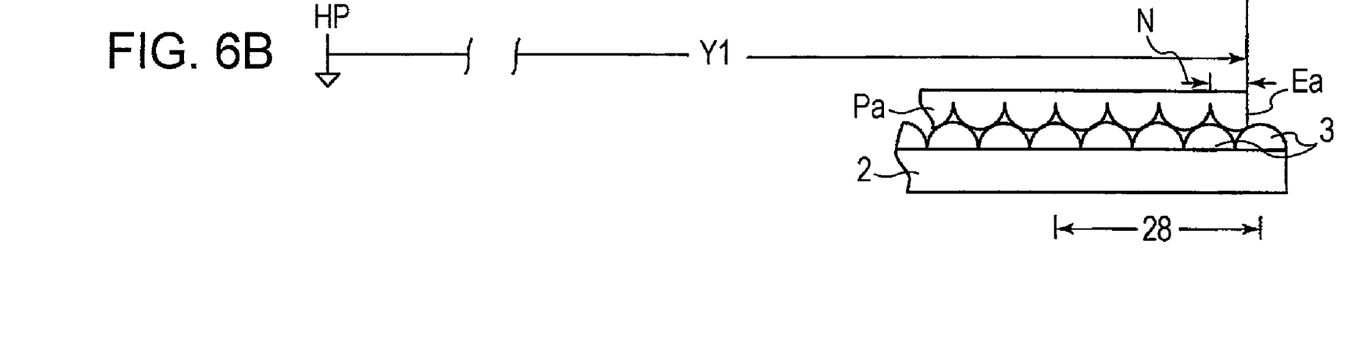

That is to say, as illustrated in FIGS. 6A and 6B, in a state where the target recording medium Pa and the reference recording medium Pb are mounted at a predetermined position of the guide tray 2 (namely, the mounting positions of the target recording medium Pa and the reference recording medium Pb at which the lens elements L which do not have any deficiency and are disposed inside the edges Ea and Eb, are positioned at identical positions on the guide tray 2), the difference in the distance from the home position HP, of the edge Ea of the target recording medium Pa and the edge Eb of the reference recording medium Pb, namely, Y1–X1 is identical to the difference between the width M of the lens element L disposed at the edge Eb of the reference recording medium Pb and the width N of the lens element L disposed at the edge Ea of the target recording medium Pa. Since the width (M) of the lens element L disposed at the edge Eb of the reference recording medium Pb of which the measured distance is X1 is known, the addition of the known lens width M and the difference (Y1–X1) corresponds to the lens width N of the lens element L disposed at the edge Ea of the target recording medium Pa. That is to say, since the lens width of the lens elements L without any deficiency is known, the subtraction of the lens width N of the lens element L with deficiency from the known lens width (of the lens elements L without any deficiency) is calculated as the deficient width of the lens element L disposed at the edge Ea of the target recording medium Pa. In addition, when the edge Eb of the reference recording medium Pb is cut at the valley of the neighboring lens elements L so that the lens element L at the edge Eb does not have any deficiency, the width M of the lens element L disposed at the edge Eb of the reference recording medium Pb is calculated as 0.

When recording is performed on the target recording medium Pa, the printer 1 performs the recording by correcting the recording position based on the deficient width. By performing the recording in such a manner, it is possible to align the positions of the images to comply with the arrangement pitch, etc. of the lenticular lens RL.

Figure 7:
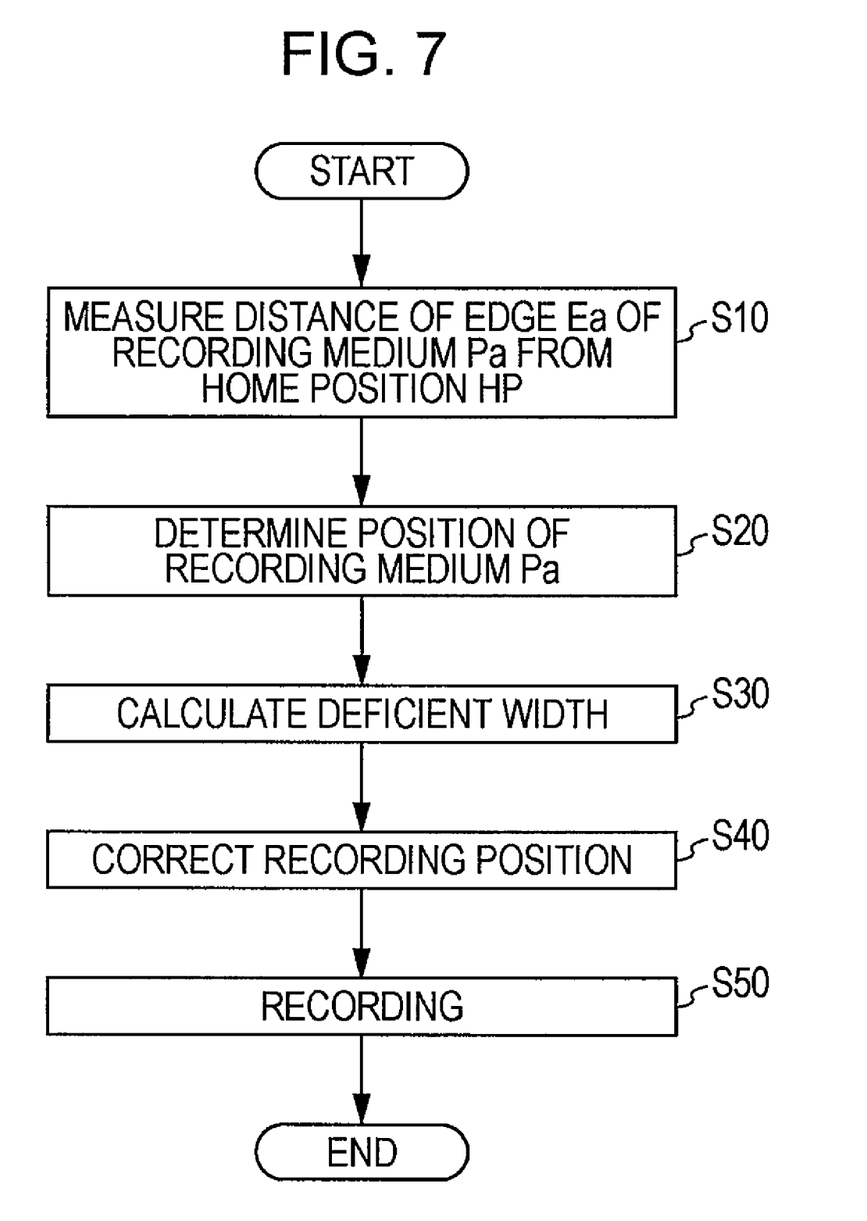
FIG. 7 is a flowchart illustrating the operation of the printer.

In the printer 1, the CPU 24 as the deficient width calculation unit calculates the deficient width by performing the processing illustrated in the flowchart of FIG. 7.

First, in a state where the target recording medium Pa is mounted on the guide tray 2 so that the edge Ea of the target recording medium Pa is positioned within the predetermined range 28, the carriage 11 is moved rightward from the home position HP and the distance from the home position HP, of the edge Ea is measured as an encoder value by using the recording medium detection sensor 18 and the encoder 8 which function as the distance information acquisition unit (step S10).

Subsequently, a determination is made as to whether the mounting position of the target recording medium Pa is identical to any of the mounting positions Q0, Q1, Q2, and Q3 of the reference recording medium Pb (step S20). This determination is performed in the following manner.

First, the values (X1−M, X2−M, X3−M, and X4−M) obtained by subtracting the known lens width M of the lens element L disposed at the edge Eb of the reference recording medium Pb from the values of the measured distance (X1, X2, X3, and X4) of the edge Eb of the reference recording medium Pb are calculated. These values (X1−M, X2−M, X3−M, and X4−M) are identical to the distances (the encoder values) between the position of the valley disposed between the lens element L with deficiency disposed at the edge Eb of the reference recording medium Pb and the lens element L without any deficiency, neighboring the lens element L, and the home position HP. Subsequently, the measured distances (Y1, Y2, Y3, and Y4) of the edge Ea of the target recording medium Pa are compared with the above-mentioned values (X1−M, X2−M, X3−M, and X4−M) so as to specify a value which is smaller than the measured distances (Y1, Y2, Y3, and Y4) and closest to the measured distances (Y1, Y2, Y3, and Y4) from these values (X1−M, X2−M, X3−M, and X4−M). This specified value (any one of X1−M, X2−M, X3−M, and X4−M) is a value that corresponds to any one of the mounting positions Q0, Q1, Q2, and Q3. Therefore, it can be determined that the mounting position of the target recording medium Pa is identical to the mounting position Q0, Q1, Q2, or Q3 corresponding to the above-mentioned specified value (any one of X1−M, X2−M, X3−M, and X4−M). In this way, it is possible to identify the predetermined position of the target recording medium Pa and the reference recording medium Pb, at which the lens elements L, which do not have any deficiency and are disposed inside the edges Ea and Eb, are positioned at identical positions on the guide tray 2.

However, the information on the measured distance of the edge Eb of the reference recording medium Pb is obtained when the reference recording medium Pb is mounted at a position located within the predetermined range 28. Therefore, it is necessary for the target recording medium Pa to be mounted at a position located inside the predetermined range 28. For this mounting, in the present embodiment, the lens elements L corresponding to the predetermined range 28 are colored so that the target recording medium Pa is mounted on the guide tray 2 in a state where the edge Ea is positioned inside the predetermined range 28 with certainty. In other words, the predetermined range 28 functions as a mark for mounting the target recording medium Pa at the predetermined position.

Based on the distances from the home position HP, of the edges Ea and Eb when the target recording medium Pa and the reference recording medium Pb are mounted at the above-mentioned predetermined position, the deficient width K (which is the counted value of the pulse count measured by the encoder 8) can be calculated from Equation 1 below (step S30).

Equation 1

$$K = (X_n - X_{n+1})\left\{1 - \frac{M + (Y_n - X_n)}{(X_n - X_{n+1})}\right\} \quad (1)$$

Yn: Measured distance of the edge Ea of the target recording medium Pa from the home position HP Xn: Measured distance of the edge Eb of the reference recording medium Pb mounted at the same position as the target recording medium Pa from the home position HP Xn+1: Measured distance of the edge Eb of the reference recording medium Pb mounted at the position displaced rightward by one protrusion from the mounting position of the target recording medium Pa from the home position HP M: Lens width of the lens element L positioned at the edge Eb of the reference recording medium Pb, which is the counted value of the pulse count measured by the encoder 8; the lens width is 0 if the lens element L exhibits no deficiency at the edge Eb.

In the equation, Xn+1−Xn is the width of one protrusion of the protruding portions 3 and is identical to the width of the lens element L. Since the width of the lens element L is known, by replacing it with W (which is the counted value of the pulse count measured by the encoder 8), the deficient width K may be calculated from Equation 2 below.

$$K = W - \{M + (Y_n - X_n)\} \quad \text{Equation 2}$$

Control of Recording Position

When the deficient width K is calculated by the described method, the recording position is corrected based on the deficient width K (step S40). If the correction based on the deficient width K is not performed during recording on the target recording medium Pa, the recording is performed with the assumption that the lens element L disposed at the edge Ea has no deficiency. That is to say, the recording is performed based on the distance of the carriage 11 from the edge Ea with the assumption that the lens elements L having an equal width are arranged at equal pitches from the edge Ea. Therefore, if the lens element L disposed at the edge Ea has any deficiency, it is difficult to perform the recording so as to comply with the arrangement pitch, etc. of the lenticular lens RL.

Therefore, when the lens element L disposed at the edge Ea is deficient, the position serving as the reference of the recording position is corrected to a position which is moved outward (rightward) by the deficient width K from the edge Ea (step S40). Then, the recording is performed based on the corrected reference position (step S50), whereby the recorded images can become compliant with the arrangement pitch, etc. of the lenticular lens RL.

Modification 1

When the correction amount of the recording position in the case of performing recording on the reference recording medium Pb is known in advance as information on the reference recording medium Pb (that is, stored in the EEPROM 25 as the storage unit), and moreover, when the correction amount of the recording position in the case of performing recording on the reference recording medium Pb is set in advance in the printer 1, the correction of the recording position in the case of performing recording on the target recording medium Pa can be performed in the following manner.

Figure 8:
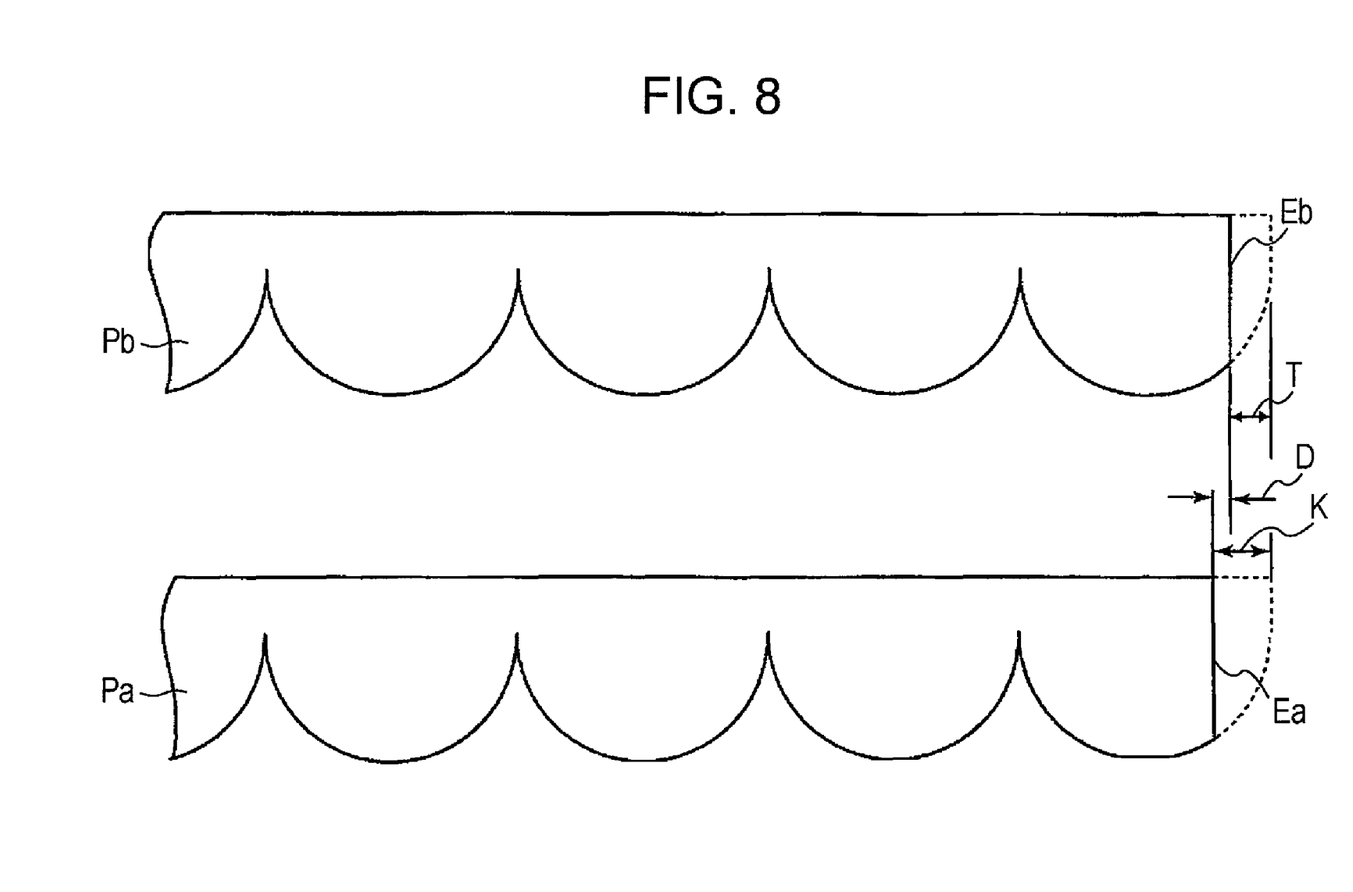
FIG. 8 is a schematic view for explaining another example of the method of correcting a recording position.

As illustrated in FIG. 8, when the printer 1 performs recording on the target recording medium Pa with the correction amount of the recording position, known in advance for the reference recording medium Pb (that is, stored in the EEPROM 25 as the storage unit), set to T (which is the counted value of the pulse count measured by the encoder 8), the recording position is configured to be corrected to a position which is moved leftward by the correction amount T from the edge Ea. In this case, when recording is performed on the reference recording medium P as the target recording medium Pa, the recording position can become compliant with the arrangement pitch, etc. of the lenticular lens RL. On the other hand, when recording is performed on a target recording medium Pa different from the reference recording medium P, it may be difficult to have the recording position become compliant with the arrangement pitch, etc. of the lenticular lens RL using the correction amount for the reference recording medium P.

However, as illustrated in FIG. 8, the position obtained by adding the difference D obtained by subtracting the correction amount T from the deficient width K of the lens element L of the target recording medium Pa, calculated by the above-described method, to the position of the edge Ea of the target recording medium Pa corresponds to the position of the edge Eb of the reference recording medium P. Therefore, by performing recording based on the position obtained by adding the measured position of the edge Ea of the target recording medium Pa to the difference between the deficient width K and the correction amount T, the printer 1 is able to record images on the target recording medium Pa at positions corresponding to the arrangement pitch, etc. of the lenticular lens RL by correcting the recording position in the same manner as that of the reference recording medium P.

Modification 2

The correction of the recording position on the target recording medium Pa may be performed in the following manner. First, the distance from the home position HP to the edge Ea of the target recording medium Pa when the target recording medium Pa is mounted at the same position as the mounting position (any one of Q0, Q1, Q2, and Q3) of the reference recording medium Pb is measured. This distance is measured as any one of the measured distances Y1, Y2, Y3, and Y4 illustrated in FIGS. 5A to 5D, for example. Then, the lens width difference calculation unit configured by the CPU 24 calculates the difference S between the measured distance (Y1, Y2, Y3, and Y4) and the measured distance of the reference recording medium Pb corresponding to the mounting position of the target recording medium Pa based on Equation 3 below.

$$S = Yn - Xn \qquad \text{Equation 3}$$

This difference S is the difference between the lens width of the lens element L at the edge Ea of the target recording medium Pa and the lens width of the lens element L at the edge Eb of the reference recording medium Pb. Therefore, the CPU 24 configured as the correction unit calculates the value F obtained by subtracting the difference S from the correction amount T as the information which is known in advance for the reference recording medium Pb (that is, stored in the EEPROM 25 as the storage unit). Then, the CPU 24 controls the recording head 6 and the like to perform recording by using the position obtained by adding the value F as the correction amount to the measured position of the edge Ea of the target recording medium Pa as the reference position, whereby images can be recorded on the target recording medium Pa at positions corresponding to the arrangement pitch, etc. of the lenticular lens RL. If the edge Ea of the target recording medium Pa is positioned at a position which is located further away from the home position HP than the edge Eb of the reference recording medium Pb, the difference S will be positive. In this case, the correction amount F for the target recording medium Pa becomes smaller than the correction amount T. On the contrary, if the edge Ea of the target recording medium Pa is positioned at a position which is located closer to the home position HP than the edge Eb of the reference recording medium Pb, the difference S will be negative. In this case, the correction amount F for the target recording medium Pa becomes larger than the correction amount T.

That is to say, by performing recording based on the position obtained by adding the measured position of the edge Ea of the target recording medium Pa to the above-mentioned correction amount F, the printer 1 is able to record images on the target recording medium Pa at positions corresponding to the arrangement pitch, etc. of the lenticular lens RL by correcting the recording position in the same manner as that of the reference recording medium P. By doing so, images can be recorded on the target recording medium Pa at positions corresponding to the arrangement pitch, etc. of the lenticular lens RL, even when the width M of the lens element L disposed at the edge Eb of the reference recording medium Pb is not known in advance.

By configuring the printer 1 as described above, it is possible to align the recording position to comply with the arrangement pitch, etc. of the lens elements L even when the cutting accuracy of the target recording medium Pa is poor. Moreover, since the printer 1 is configured such that it only needs to detect the edge of the target recording medium Pa, the arrangement shape of the lens elements L can be grasped by a reflective sheet detection sensor without necessity of equipping a transmissive sensor for lens detection. Therefore, the printer 1 can be configured with low cost and have high versatility.

The detection accuracy of the edges Ea and Eb can be improved by configuring the encoder 8 as follows. For example, when the resolution of the linear scaler 16 is 180 dpi and the printing resolution of the recording head 6 is 2880 dpi, by multiplying the encoder signal by 16 (2880/180) to increase the detection accuracy, it is possible to increase the accuracy of the detected position. However, such a multiplication may not be implemented depending on the circuit used.

Figure 9:
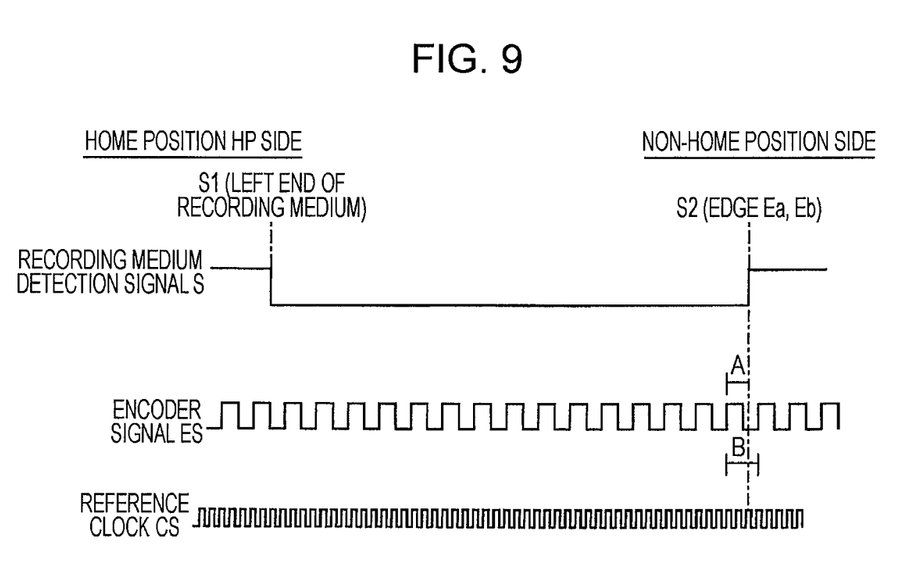
FIG. 9 is a schematic view for explaining an example of the method of measuring the distance of an edge.

In such a case, as illustrated in FIG. 9, the value obtained by adding the division of intervals A/B to the counted value e of the encoder signal ES from the encoder 8 may be used as the detected position. In FIG. 9, the recording medium detection signal S represents the output signal from the recording medium detection sensor 18, and the position S1 of the recording medium detection signal S corresponds to the left end of the recording medium P, and the position S2 corresponds to the edges Ea and Eb of the recording medium P. The interval A is the counted value counted based on the reference clock signal CS from the positive edge of the encoder signal ES to the edge Ea (Eb) of the recording medium P. On the other hand, the interval B is the counted value counted based on the reference clock signal CS, corresponding to one cycle of the pulse signal of the encoder signal ES. In this way, by using the clock signal CS, it is possible to increase the detection accuracy of the edge Ea (Eb).

Instead of detecting the moving distance of the carriage from the home position HP to the edge Ea (Eb) by using the encoder 8, the time taken for the carriage 11 to move from the home position HP to the edge Ea (Eb) may be counted based on the clock signal.

Although the above-described embodiment is configured so that the calculation of the correction amount and the control of the correction are performed by the control unit 21 of the printer 1, the operations may be performed by the host computer HC. In this case, the host computer HC functions as the deficient width calculation unit.

What is claimed is:

1. A recording apparatus capable of performing recording on a recording medium having a lenticular lens, comprising:
    a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element;
    a distance information acquisition unit that acquires information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed;
    a correction unit that corrects the recording position on the target recording medium based on the distance information obtained by the distance information acquisition unit; and
    a recording unit that performs recording on the recording medium based on the recording position corrected by the correction unit.

2. The recording apparatus according to claim 1, further comprising a storage unit,
    wherein the correction unit performs the correction based on information on the reference recording medium stored in the storage unit.

3. The recording apparatus according to claim 1, further comprising a lens width difference calculation unit that calculates the difference between a lens width of the lens element at the edge of the reference recording medium and a lens width of the lens element at the edge of the target recording medium based on information on the distance between the reference edge and the predetermined reference position when the reference recording medium is mounted at a predetermined position on the mounting portion and the distance information on the target recording medium,
    wherein the correction unit corrects the recording position on the recording medium based on the difference in the lens width and the correction amount.

4. The recording apparatus according to claim 1, wherein the mounting portion has a mark for mounting the target recording medium at the predetermined position.

5. The recording apparatus according to claim 1, wherein the positioning structure is formed of the same member as the lenticular lens of the recording medium.

6. A recording apparatus capable of performing recording on a recording medium having a lenticular lens, comprising:
    a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element;
    a distance information acquisition unit that acquires information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed; and
    a deficient width calculation unit that calculates a deficient width of the lens element at the edge of the target recording medium based on information on the distance between the reference edge and the predetermined reference position when a reference recording medium which is the recording medium, and of which the lens width of the lens element at the reference edge is known, is mounted at the predetermined position on the mounting portion, and the distance information on the target recording medium,
    wherein the recording position on the target recording medium is corrected based on the deficient width calculated by the deficient width calculation unit.

7. A recording method for printing using a printer on a recording medium having a lenticular lens, mounted on a mounting portion on which the recording medium is mounted, the mounting portion including a positioning structure that comes to be positioned between neighboring lens elements of the lenticular lens of the recording medium so as to be engaged with at least one of the lens elements, thereby positioning the recording medium with respect to the arrangement direction of the lens element, the method comprising:
    acquiring information on the distance between a reference edge, which serves as the reference of a recording position and is defined at the edge in the arrangement direction of the lens elements, and a predetermined reference position with respect to a target recording medium which is the recording medium which is mounted at a predetermined position of the mounting portion in a state of being positioned by the positioning structure, and on which recording is actually performed;
    correcting the recording position on the target recording medium based on the distance information obtained in the distance information acquisition step; and
    recording on the recording medium based on the recording position corrected in the correction step.

* * * * *